United States Patent [19]

Dreyer, Jr.

[11] Patent Number: 5,043,850
[45] Date of Patent: Aug. 27, 1991

[54] DIRECTION DEPENDENT LINE LIGHT SOURCE

[75] Inventor: John F. Dreyer, Jr., North Oaks, Minn.

[73] Assignee: Minnesota Mining and Manufacturing Company, St. Paul, Minn.

[21] Appl. No.: 462,755

[22] Filed: Jan. 10, 1990

[51] Int. Cl.⁵ ............................................. F21V 8/00
[52] U.S. Cl. ..................................... 362/26; 362/32; 362/27; 362/242; 362/243; 362/293
[58] Field of Search ............... 362/32, 26, 27, 228, 362/230, 231, 242, 293, 243, 235; 116/26, 63 R, 202

[56] References Cited

U.S. PATENT DOCUMENTS

| 3,386,043 | 5/1968 | Marcatili et al. | 330/4.3 |
|---|---|---|---|
| 3,436,141 | 4/1969 | Comte | 350/319 |
| 3,506,331 | 4/1970 | Kompfner | 350/95 |
| 3,583,786 | 6/1971 | Marcatili | 350/96 WG |
| 3,832,029 | 8/1974 | Bryngdahl | 350/96 T |
| 3,913,872 | 10/1975 | Weber | 350/41 R |
| 3,973,828 | 8/1976 | Onoda et al. | 350/96 WG |
| 4,120,332 | 12/1978 | Rowe | 362/32 |
| 4,157,209 | 6/1979 | Amendolia | 116/202 |
| 4,422,719 | 12/1983 | Orcutt | 350/96.30 |
| 4,453,803 | 6/1984 | Hidaka et al. | 350/96.32 |
| 4,459,642 | 7/1984 | Mori | 362/32 |
| 4,464,705 | 8/1984 | Horowitz | 362/228 |
| 4,636,036 | 1/1987 | Pasquali | 362/243 |
| 4,805,984 | 2/1989 | Cobb, Jr. | 350/96.28 |

Primary Examiner—Ira S. Lazarus
Assistant Examiner—Sue Hagarman
Attorney, Agent, or Firm—Gary L. Griswold; Roger R. Tamte; Peter Forrest

[57] ABSTRACT

A light source substantially longer than its diameter exhibits two different optical characteristics, such as two different colors, depending upon the direction along the long axis from which it is viewed. The light source comprises a light conduit employing total internal reflection and two illumination sources directing light into the light conduit from opposite ends.

8 Claims, 1 Drawing Sheet

DIRECTION DEPENDENT LINE LIGHT SOURCE

TECHNICAL FIELD

This invention relates to light sources which employ light conduits operating on the principle of total internal reflection.

BACKGROUND

Lights used in traffic and navigational control are generally point or near-point sources. Typically such sources are monochromatic, and the color designates a type of hazard in the vicinity of the light, or a particular traffic direction allowed, etc. For bidirectional or multidirectional indication, point sources may be arranged back-to-back or in an array, with differently colored sources used in each direction. Alternatively, a rotating source may be used. Examples include rotating airport beacons, and reversible traffic lane directional signals.

DISCLOSURE OF INVENTION

The invention is a direction dependent line light source, comprising: (a) a light conduit which has an interior side and two opposite ends, and is longer in length than in cross sectional width, consisting essentially of a hollow thin film of a totally internally reflecting material; and (b) two illumination sources which produce illuminations differing from each other in at least one optical property. The first source is directed into one end of the light conduit, and the second source is directed into the opposite end of the light conduit. Illumination leaving sides of the light conduit has an optical property determined by the direction in which it travels through the light conduit, and leaves the light conduit at essentially the same angle at which it strikes the interior side of the light conduit.

DETAILED DESCRIPTION OF THE INVENTION

Figure 1:
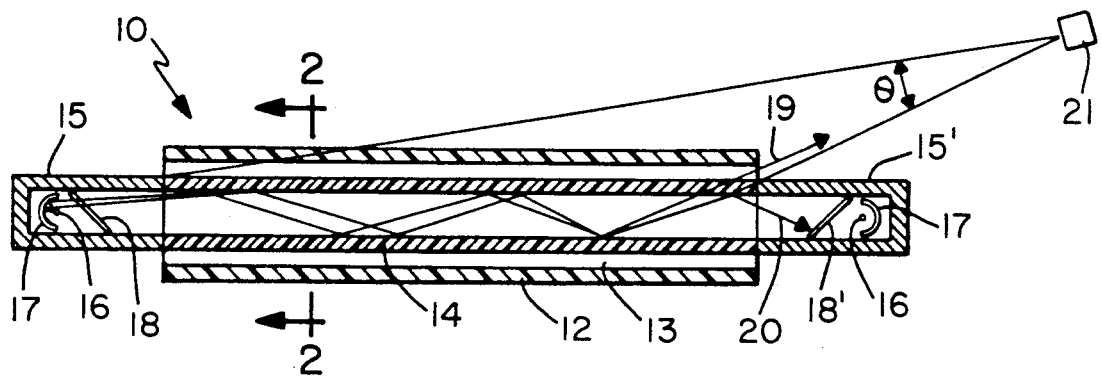
FIG. 1 is a cross sectional view of one preferred embodiment of the invention.
Figure 2:
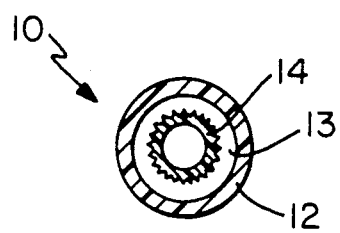
FIG. 2 is a cross sectional view taken along the line 2—2 of FIG. 1.

FIGS. 1 and 2 are cross sectional views of one embodiment of the invention, designated as line light source 10. The embodiment as shown comprises two generally cylindrical hollow members having a common long axis, i.e., one within the other. The outer member is a strong, optically clear protective cover 12, and while it is preferred, it is not required. The inner member is a totally internally reflecting (TIR) thin film light conduit 14. The diameter of the cover 12 may be large enough to create an airspace 13 between the cover 12 and the thin film 14, but this also is not required.

The preferred light conduit 14 comprises a longitudinal hollow structure made of transparent dielectric material, as taught in U.S. Pat. No. 4,805,984 (Cobb, Jr.). The hollow structure is formed of a thin, flexible polymeric film having a smooth surface (the inner side as shown in FIG. 2) and a structured outer surface. Either surface may be on the inner side, but the arrangement of FIG. 2 provides optimum performance. The structured surface consists of a linear array of substantially right angled isosceles prisms arranged side by side. The perpendicular sides of each prism make an angle of approximately 45° with the tangent to the adjacent smooth surface opposite the structured surface.

The preferred light conduit 14 is made from a material which must be transparent, and preferably is flexible, homogeneous, and isotropic. Suitable materials include commercially available acrylics and polycarbonates having nominal indices of refraction of 1.49 and 1.58, respectively. Other possible materials, selected to provide the required functionality, include polypropylenes, polyurethanes, polystyrenes, and polyvinylchlorides. Generally, polycarbonates are preferred for their relatively high indices of refraction and physical properties.

A suitable thickness of the TIR thin film used for the light conduit 14 is 0.38 millimeters, measured from the smooth inner surface to the lowest point of the grooves. For such a film, about 27 peaks per centimeter of perimeter is preferred. This film can be curved into a cylinder of about 7.6 to 45.7 centimeters diameter, depending on the application. The light conduit 14 may be a single section or multiple sections joined together, as required.

The combination of the shape of the structured surface, and the optical properties of the material chosen, produce total internal reflection of light, if the light is properly directed into the light conduit 14.

At each end of the line light source 10 is one of two illumination sources 15 and 15'. The illumination sources 15, 15' close off each end of the light conduit 14.

The illuminations provided by illumination sources 15, 15' must differ from each other in at least one optical property detectable by detector 21. In the embodiment shown, each illumination source 15, 15' comprises a point source of light 16 and a reflector 17. The reflector keeps the light collimated and properly directed into the light conduit 14. The size of the point source 16 determines the shape of reflector 17, e.g. parabolic or elliptical or other shapes known in the art. The use of a point source 16 and a reflector 17 is exemplary, as a point source and properly sized Fresnel lens would also provide a collumnated beam of light.

In this embodiment, each illumination source 15, 15' comprises a color filter, and in this embodiment the filters 18, 18' provide the difference in at least one optical property of the illuminations from sources 15, 15' (but may otherwise be identical). This embodiment is exemplary, however, as any illumination sources 15, 15' which produce illuminations having at least one different optical property are suitable. For example, the illumination sources 15, 15' may produce light of different colors, polarizations, intensities, modulation, or any combination of these properties.

Considering the operation of illumination source 15, light emanating from point source 16 either directly enters the light conduit 14, or is reflected into it by reflector 17. Thus, substantially all of the illumination from the point source 16 is directed into the conduit, through filter 18.

Because the light conduit 14 operates on the principle of total internal reflection, the majority of light entering the light conduit 14 propagates down the length of the light conduit 14 without being absorbed or otherwise extinguished. Because the light conduit 14 is closed at each end by the illumination sources 15, 15', the only means by which light in the light conduit may escape is leakage.

Leakage occurs due to imperfections in the light conduit such as anisotropy in materials, or flaws in construction. Light leaving a light conduit by leakage leaves the conduit at substantially the same angle of incidence as that at which it strikes the conduit. This is in contrast to the extraction of light from light conduits taught in the prior art, which rely on diffusers or extractors to significantly change the direction of light rays within the light conduit by scattering, so that the rays strike the light conduit inner surface at angles approaching normal incidence. Such techniques produce relatively small intensities when observed at angles near the axis of the light conduit, the opposite of the effect produced by the present invention.

To illustrate this, consider the two representative light rays 19 and 20 shown in FIG. 1. Light rays 19 and 20 each represent monochromatic light of the color of filter 18. Light ray 19 has leaked out of light conduit 14 within the angular acceptance $\theta$ of detector 21. Light ray 20, by contrast, travels down the light conduit on a slightly different path, such that it does not leak from the light conduit 14, but rather is absorbed (being the color of filter 18) at filter 18'. As shown in FIG. 1, the filter 18 is at an angle to the long axis of the light conduit 14. This helps prevent the light ray 20 from being reflected off the front surface of the filters 18 and back into the light conduit 14. Similarly, the filters 18 should completely cover the cross section of the light conduit 14, to prevent light from being reflected back into the light conduit 14 by the reflector at the end opposite the illumination source from which the light originated.

Thus, light of the color corresponding to filter 18 is the only light received at detector 21, and the only means by which this light escapes the light conduit 14 is leakage. Clearly, the symmetry of the invention, except for the different colored filter 18', shows that a detector on the opposite end of the line light source would receive only light having a color corresponding to the color of filter 18'.

Figure 3:
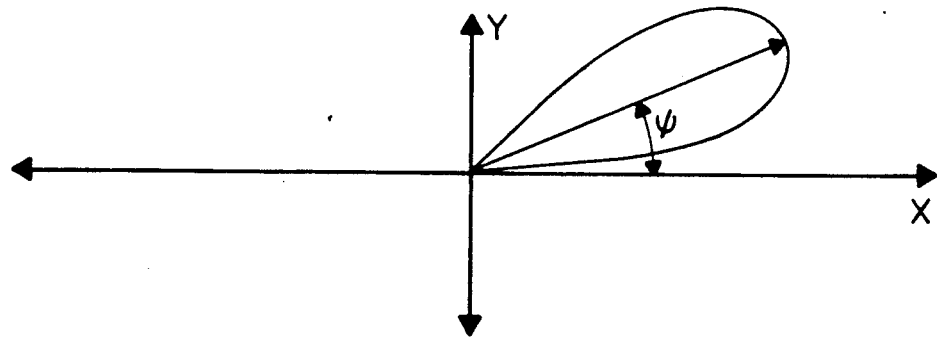
FIG. 3 is a representative polar plot of the distribution of light intensity observed from the embodiment of FIG. 1.

This distribution of light intensity is shown in the representative polar plot of FIG. 3. The plot represents the general distribution of light intensity detected from the invention by a detector lying in the first quadrant at an angle $\psi$ from the X-axis, and directed toward the origin, and lying in the plane of the Figure, the X-Y plane as designated. The plot assumes that the invention lies lengthwise on the X axis, one half lying in the +X half plane and the other half lying in the −X half plane. As shown, the detected intensity increases rapidly with increase in $\psi$. The detected intensity drops rapidly to near zero as $\psi$ approaches 90°. As noted before, this is the opposite of the effect produced by the extraction techniques presently known in the art.

The distribution is the net result of two opposing effects. The first effect is the increase in the amount of light leaving the light conduit with decreasing $\psi$, because of the generally operation of the light conduit and the use of collumnated light sources. Counteracting this, however, is the decrease of the light conduit outer surface area exposed to the detector, i.e., the perpendicular projection surface subtended by the angle $\theta$, with decreasing $\psi$. The net effect is that at small $\psi$ there is a large amount of light but little surface area, and at $\psi$ approaching 90° there is little light but much surface area, producing the observed distribution as shown in FIG. 3.

The distribution is symmetric for rotations of the detector position around the X axis. Most importantly, the distribution for a given $\psi$ in the X-Y plane is independent of the position along the X axis, i.e., either the invention may be moved lengthwise along the X axis in the X-Y plane, or the detector may be moved parallel to the X axis in the X-Y plane, and the distribution observed from a point on the invention at the angle $\psi$ in the X-Y plane (though this point will no longer be at the origin as shown) will not change appreciably.

For light observed from a detector located in any other quadrant of the X-Y plane, the distribution is the reflection of that shown in FIG. 3 about the axis between the half-planes. Thus, in the X-Y plane, the total light intensity distribution (including light from both sides of the light conduit) is four-lobed.

Of course, for detector positions not in the X-Y plane, the distribution would be represented by a solid generated by rotating the planar distributions about the appropriate axes of symmetry.

To operate as a line light source, the light conduit 14 must be longer in length than in cross sectional width, i.e., it must have an aspect ratio greater than one. In general, the greater the aspect ratio, the more effective the embodiment of the invention. However, aspect ratios greater than three hundred are not preferred, as the gradual loss of light in the light conduit 14 at increasing lengths makes these embodiments unsuitable at the ends for effective operation in many applications.

This loss of intensity may be reduced somewhat by gradually tapering the ends of the light conduit into a slightly smaller diameter than that of the middle section. This decreases the angle of incidence at which rays originating at the opposite end of the conduit strike the inner surface of the conduit at the other, tapered end, which in turn increases light leakage, compensating for the loss in intensity of such far-travelling rays. In practical application, such an embodiment of the invention would have a center section which is not tapered, and two gradually tapered end sections. Each of the three sections would be approximately the same length. The amount of tapering would depend upon the application.

Except for the effects of gradual tapering, the cross section of the light conduit 14 should be constant along the longitudinal axis so that the distribution of light is uniform along the length of the light conduit 14. The cross section should also be circular to ensure that the inner surface is perpendicular to all rays nominally traveling along the longitudinal axis. A circular cross section also provides a symmetric distribution of light around the longitudinal axis.

EXAMPLE

An embodiment of the invention was constructed according to the general design of FIGS. 1 and 2. It was approximately 180 centimeters in length, exclusive of the illumination sources. The inner diameter of the light conduit was approximately 3.2 cm in diameter (an aspect ratio of approximately 56), the inner diameter of the cover was approximately 4.4 cm, and the outer diameter of the cover was approximately 7 cm. The illumination sources were conventional 85 watt halogen lamps, with elliptical reflectors. A red filter was placed at one end of the line light source and a green filter at the other end.

The line light source clearly exhibited different colors, as observed by the naked eye, depending on the viewing direction chosen. The effect was most pronounced when a mirror was placed at the end of the invention having the green filter, and ambient light removed. Then one could easily observe and photograph a green tubular real image directly from the invention, and through reflection in the mirror, a red virtual image of the invention.

I claim:

1. A direction dependent line light source, comprising:
   (a) a light conduit having an interior side and two opposite ends, being longer in length than in cross sectional width, consisting essentially of a hollow thin film of a totally internally reflecting material, and
   (b) two illumination sources which produce illuminations differing in at least one optical property, a first source directed into one end of the light conduit and a second source directed into an opposite end of the light conduit, in which illumination leaving sides of the light conduit has an optical property determined by the direction in which it travels through the light conduit, and which leaves the light conduit at essentially the same angle at which it strikes the interior side of the light conduit.

2. The direction dependent line light source of claim 1, in which the optical property is color.

3. The direction dependent line light source of claim 1, in which the optical property is polarization.

4. The direction dependent line light source of claim 1, in which the optical property is intensity.

5. The direction dependent line light source of claim 1, in which the optical property is modulation.

6. The direction dependent line light source of claim 1, further comprising an optically clear protective covering.

7. The direction dependent line light source of claim 1, in which the light conduit has an aspect ratio less than three hundred.

8. An optical system comprising the direction dependent line light source of claim 1 and at least one detector adapted to the optical property of at least one of the illuminations.

* * * * *